US011567973B2

(12) United States Patent
Kalmes et al.

(10) Patent No.: US 11,567,973 B2
(45) Date of Patent: *Jan. 31, 2023

(54) FEEDBACK LOOP CONTENT RECOMMENDATION

(71) Applicant: TIVO CORPORATION, San Jose, CA (US)

(72) Inventors: Chad Kalmes, Lafayette, CA (US); Mark Jacobson, San Francisco, CA (US); Tim Lynch, San Anselmo, CA (US)

(73) Assignee: TiVo Corporation, San Jose, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/115,736

(22) Filed: Dec. 8, 2020

(65) Prior Publication Data
US 2021/0326360 A1    Oct. 21, 2021

Related U.S. Application Data

(63) Continuation of application No. 16/116,873, filed on Aug. 29, 2018, now Pat. No. 10,885,063, which is a continuation of application No. 14/503,357, filed on Sep. 30, 2014, now Pat. No. 10,095,767, which is a continuation of application No. 13/661,294, filed on Oct. 26, 2012, now Pat. No. 8,881,209.

(51) Int. Cl.
| G06F 17/30 | (2006.01) |
| G06F 16/28 | (2019.01) |
| G06F 16/48 | (2019.01) |
| G06F 16/435 | (2019.01) |

(52) U.S. Cl.
CPC .......... *G06F 16/284* (2019.01); *G06F 16/435* (2019.01); *G06F 16/48* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 6,606,102 B1 | 8/2003 | Odom |
| 7,434,244 B2 | 10/2008 | Popov et al. |
| 7,836,051 B1 | 11/2010 | Mason |
| 8,026,805 B1 | 9/2011 | Rowe |

(Continued)

OTHER PUBLICATIONS

"U.S. Appl. No. 13/607,621, Advisory Action dated Jul. 2, 2014", 4 pgs.

(Continued)

*Primary Examiner* — Hung D Le
(74) *Attorney, Agent, or Firm* — Haley Guiliano LLP

(57) ABSTRACT

Media content may be recommended based on feedback weightings. Input data describing the presentation of a media content items in association with content management accounts may be represented as data points. Each data point may identify feedback data for a media content item previously recommended for presentation in association with a content management account. The feedback data may identify a viewer reaction to the recommended media content item. A weighting factor based on the feedback data for the media content item presented in association with the content management account may be applied to produce a recommendation.

20 Claims, 9 Drawing Sheets

(56) References Cited

U.S. PATENT DOCUMENTS

| | | | |
|---|---|---|---|
| 8,320,746 B2 | 11/2012 | Barrett et al. | |
| 8,401,983 B2 | 3/2013 | Bodor et al. | |
| 8,434,024 B2 | 4/2013 | Curtis | |
| 8,452,758 B2 | 5/2013 | Tong et al. | |
| 8,510,247 B1 | 8/2013 | Kane et al. | |
| 8,533,066 B2* | 9/2013 | Wei | G06Q 30/0281 705/26.7 |
| 8,538,970 B1 | 9/2013 | Tucker | |
| 8,589,319 B2 | 11/2013 | Balakrishnan et al. | |
| 8,612,456 B2 | 12/2013 | Bi et al. | |
| 8,732,737 B1 | 5/2014 | Kalmes et al. | |
| 8,776,111 B1 | 7/2014 | Eldering et al. | |
| 8,881,209 B2 | 11/2014 | Kalmes et al. | |
| 2001/0014975 A1 | 8/2001 | Gordon et al. | |
| 2003/0106058 A1 | 6/2003 | Zimmerman et al. | |
| 2005/0022239 A1 | 1/2005 | Meuleman | |
| 2005/0076365 A1 | 4/2005 | Popov et al. | |
| 2005/0288954 A1 | 12/2005 | McCarthy et al. | |
| 2006/0015902 A1* | 1/2006 | Matsuura | H04N 7/17318 348/E7.071 |
| 2006/0259293 A1 | 11/2006 | Orwant | |
| 2007/0204308 A1 | 8/2007 | Nicholas et al. | |
| 2008/0134043 A1* | 6/2008 | Georgis | H04L 67/104 348/E7.071 |
| 2008/0243733 A1 | 10/2008 | Black | |
| 2008/0250312 A1 | 10/2008 | Curtis | |
| 2009/0063496 A1 | 3/2009 | Cunningham et al. | |
| 2009/0154899 A1 | 6/2009 | Barrett et al. | |
| 2009/0210290 A1 | 8/2009 | Elliott et al. | |
| 2009/0217315 A1 | 8/2009 | Malik et al. | |
| 2010/0058390 A1 | 3/2010 | Harris et al. | |
| 2010/0076968 A1 | 3/2010 | Boyns et al. | |
| 2010/0153292 A1 | 6/2010 | Ma et al. | |
| 2010/0199295 A1 | 8/2010 | Katpelly et al. | |
| 2010/0251299 A1 | 9/2010 | Scott et al. | |
| 2010/0318544 A1 | 12/2010 | Nicolov | |
| 2011/0137818 A1 | 6/2011 | Goad et al. | |
| 2011/0154382 A1 | 6/2011 | Chow et al. | |
| 2011/0161085 A1 | 6/2011 | Boda et al. | |
| 2011/0320462 A1 | 12/2011 | Bao et al. | |
| 2012/0078829 A1 | 3/2012 | Bodor et al. | |
| 2012/0096086 A1 | 4/2012 | Wei et al. | |
| 2012/0096488 A1 | 4/2012 | Wei et al. | |
| 2012/0123992 A1 | 5/2012 | Randall | |
| 2012/0143871 A1 | 6/2012 | Liebald et al. | |
| 2012/0151511 A1* | 6/2012 | Bernard | H04N 21/4826 725/10 |
| 2012/0159337 A1 | 6/2012 | Travilla et al. | |
| 2012/0278831 A1* | 11/2012 | van Coppenolle | H04L 65/612 725/25 |
| 2012/0304223 A1 | 11/2012 | Sargent et al. | |
| 2012/0310771 A1 | 12/2012 | Selinger et al. | |
| 2012/0331494 A1 | 12/2012 | Pontual et al. | |
| 2013/0006765 A1 | 1/2013 | Lee | |
| 2013/0007830 A1 | 1/2013 | Klappert et al. | |
| 2013/0067515 A1* | 3/2013 | Barish | H04N 21/812 725/38 |
| 2013/0081084 A1 | 3/2013 | Scheer | |
| 2013/0097101 A1 | 4/2013 | Ortiz | |
| 2013/0139192 A1 | 5/2013 | Fontan et al. | |
| 2013/0174187 A1 | 7/2013 | Tan | |
| 2013/0204825 A1 | 8/2013 | Su | |
| 2013/0238748 A1 | 9/2013 | Sakahira et al. | |
| 2013/0290110 A1 | 10/2013 | Luvogt et al. | |
| 2013/0325879 A1 | 12/2013 | Wei et al. | |
| 2013/0332962 A1 | 12/2013 | Moritz et al. | |
| 2014/0074858 A1 | 3/2014 | Kalmes et al. | |
| 2014/0122502 A1 | 5/2014 | Kalmes et al. | |
| 2014/0149326 A1 | 5/2014 | Kalmes et al. | |
| 2014/0149424 A1 | 5/2014 | Kalmes et al. | |
| 2014/0149425 A1 | 5/2014 | Kalmes et al. | |
| 2014/0150005 A1 | 5/2014 | Kalmes et al. | |
| 2014/0215506 A1 | 7/2014 | Kalmes et al. | |
| 2015/0019573 A1 | 1/2015 | Kalmes et al. | |
| 2015/0058903 A1 | 2/2015 | Iyengar et al. | |
| 2016/0019627 A1 | 1/2016 | Musil et al. | |

OTHER PUBLICATIONS

"U.S. Appl. No. 13/607,621, Final Office Action dated Mar. 21, 2014", 11 pgs.

"U.S. Appl. No. 13/607,621, Non Final Office Action dated Dec. 6, 2013" 11 pgs.

"U.S. Appl. No. 13/661,294, Advisory Action dated Jun. 24, 2014", 2 pgs.

"U.S. Appl. No. 13/661,294, Examiner Interview Summary dated Jun. 13, 2014", 3 pgs.

"U.S. Appl. No. 13/661,294, Final Office Action dated Apr. 14, 2014", 10 pgs.

"U.S. Appl. No. 13/661,294, Non Final Office Action dated Jan. 10, 2013" 9 pgs.

"U.S. Appl. No. 13/661,294, Notice of Allowance dated Jul. 2, 2014" 14 pgs.

"U.S. Appl. No. 13/684,292, Final Office Action dated Jul. 11, 2014", 12 pgs.

"U.S. Appl. No. 13/684,292, Non Final Office Action dated Jan. 3, 2014", 11 pgs.

"U.S. Appl. No. 13/684,295, Final Office Action dated May 5, 2015", 30 pgs.

"U.S. Appl. No. 13/684,295, Non Final Office Action dated Sep. 3, 2014", 31 pgs.

"U.S. Appl. No. 13/684,300, Advisory Action dated Jul. 2, 2014", 5 pgs.

"U.S. Appl. No. 13/684,300, Examiner Interview Summary dated Jun. 4, 2014", 3 pgs.

"U.S. Appl. No. 13/684,300, Final Office Action dated Mar. 27, 2014", 14 pgs.

"U.S. Appl. No. 13/684,300, Non Final Office Action dated Dec. 11, 2013", 13 pgs.

"U.S. Appl. No. 13/684,304, Final Office Action dated Mar. 7, 2014", 9 pgs.

"U.S. Appl. No. 13/684,304, Non Final Office Action dated Aug. 2, 2013", 9 pgs.

"U.S. Appl. No. 13/749,915, Notice of Allowance dated Dec. 23, 2013" 18 pgs.

"U.S. Appl. No. 13/749,923, Examiner Interview Summary dated Jun. 9, 2014", 3 pgs.

"U.S. Appl. No. 13/749,923, Final Office Action dated Jul. 28, 2014", 12 pgs.

"U.S. Appl. No. 13/749,923, Non Final Office Action dated Apr. 29, 2013" 11 pgs.

"U.S. Appl. No. 14/503,357, Final Office Action dated Jan. 11, 2017", 10 pages.

"U.S. Appl. No. 14/503,357, Non Final Office Action dated Jun. 14, 2016" 12 pages.

"U.S. Appl. No. 14/503,357, Non Final Office Action dated May 26, 2016" 10 pages.

"U.S. Appl. No. 14/533,003, Final Office Action dated Feb. 11, 2016", 16 pgs.

"U.S. Appl. No. 14/533,003, Non Final Office Action dated Aug. 19, 2015", 26 pgs.

Barragans-Martinez, Ana B. et al., "A hybrid content-based and item-based collaborative filtering approach to recommend TV programs enhanced with singular value decomposition", Information Sciences, vol. 180, 2010, 4290-4311.

Koren, Yehuda , "The Bellkor Solution to the Netflix Grand Prize", Retrieved from Internet <http://www.netflixprize.com/assets/GrandPrize2009_BPC_BellKor.pdf>, Aug. 2009, 10 pgs.

Lops, Pasquale et al., "Chapter 3: Content-based Recommender Systems: State of the Art and Trends", from F. Ricci et al. (eds), Recommender Systems Handbook,© Springer Science+Business Media, LLC, 2011, 73-105.

Piotte, Martin et al., "The Pragmatic Theiry solution to the Netflix Grand Prize", Pragmatic Theory Inc., Canada, Retrieved from

(56) References Cited

OTHER PUBLICATIONS

Internet <http://www.netflixprize.com/assets/GrandPrize2009_BPC_PragmaticTh eory-pdf>, Aug. 2009, 92 pgs.
Shani, Guy et al., "Chapter 8: Evaluating Recommendation Systems", from F. Ricci et al. (eds.), Recommender Systems Handbook, © Springer Science+Business Media, LLC, 2011, 257-297.
Smith, Greg, "White Paper: Content Personlization", BEAWebLogic Portal, Retrieved from Internet <http://docs.oracle.com/cd/E13218_01/wlp/docs81/whitepapers/pdf/p13n. pdf>, May 2004, 30 pgs.
Toscher, Andreas et al., "The BigChaos Solution to the Netflix Gran Prize", commendo research & consulting, Neuer Weg 23, A8580 Koflach, Austria.
Yu et al., "A Service-Oriented Platform for Ubiquitous Personalized Multimedia Provisioning", Journal of Universal Computer Science, vol. 16, No. 10 (2010), 1291-1310.

\* cited by examiner

| User Account | Content Item #1 | Content Item #2 | Content Item #3 | Content Item #4 |
|---|---|---|---|---|
| User Account #1 | 5 | 3 | 2 | 2 |
| User Account #2 | 3 | 4 | - | 1 |
| User Account #3 | - | - | 4 | 2 |
| User Account #4 | - | 2 | 3 | 5 |
| User Account #5 | 1 | 3 | 2 | 4 |

Figure 3

FEEDBACK LOOP CONTENT RECOMMENDATION

CROSS-REFERENCE TO RELATED APPLICATIONS

This application is a continuation of and claims priority to U.S. patent application Ser. No. 16/116,873 entitled FEEDBACK LOOP CONTENT RECOMMENDATION, filed on Aug. 29, 2018, by Chad Kalmes, Mark Jacobson, and Tim Lynch, which is a continuation of and claims priority to U.S. patent application Ser. No. 14/503,357 entitled FEEDBACK LOOP CONTENT RECOMMENDATION, filed on Sep. 30, 2014, by Chad Kalmes, Mark Jacobson, and Tim Lynch, which is hereby incorporated by reference in its entirety and for all purposes, and which is a continuation of and claims priority to U.S. patent application Ser. No. 13/661,294 entitled FEEDBACK LOOP CONTENT RECOMMENDATION, filed on Oct. 26, 2012, by Chad Kalmes, Mark Jacobson, and Tim Lynch, which is hereby incorporated by reference in its entirety and for all purposes.

TECHNICAL FIELD

The present disclosure relates to the recommendation of media content items.

DESCRIPTION OF RELATED ART

Content recommendation engines may be used to predict media content items that a user may be likely to enjoy. Many content recommendation engines rely upon mathematical algorithms to compute predictive models for content recommendation. The predictive models facilitate the selection of available but unviewed content items for recommendation to the user. Such selections are often based at least in part on the user's prior viewing habits. In many cases, however, developing an accurate recommendation for specific content may be difficult, such as when a user has viewed a relatively small amount of content or when the user's viewing history does not sufficiently match other users' viewing history.

BRIEF DESCRIPTION OF THE DRAWINGS

The disclosure may best be understood by reference to the following description taken in conjunction with the accompanying drawings, which illustrate particular embodiments.

FIG. 3 illustrates an example of a media content preference data and recommendation chart.

DESCRIPTION OF EXAMPLE EMBODIMENTS

Figure 1:
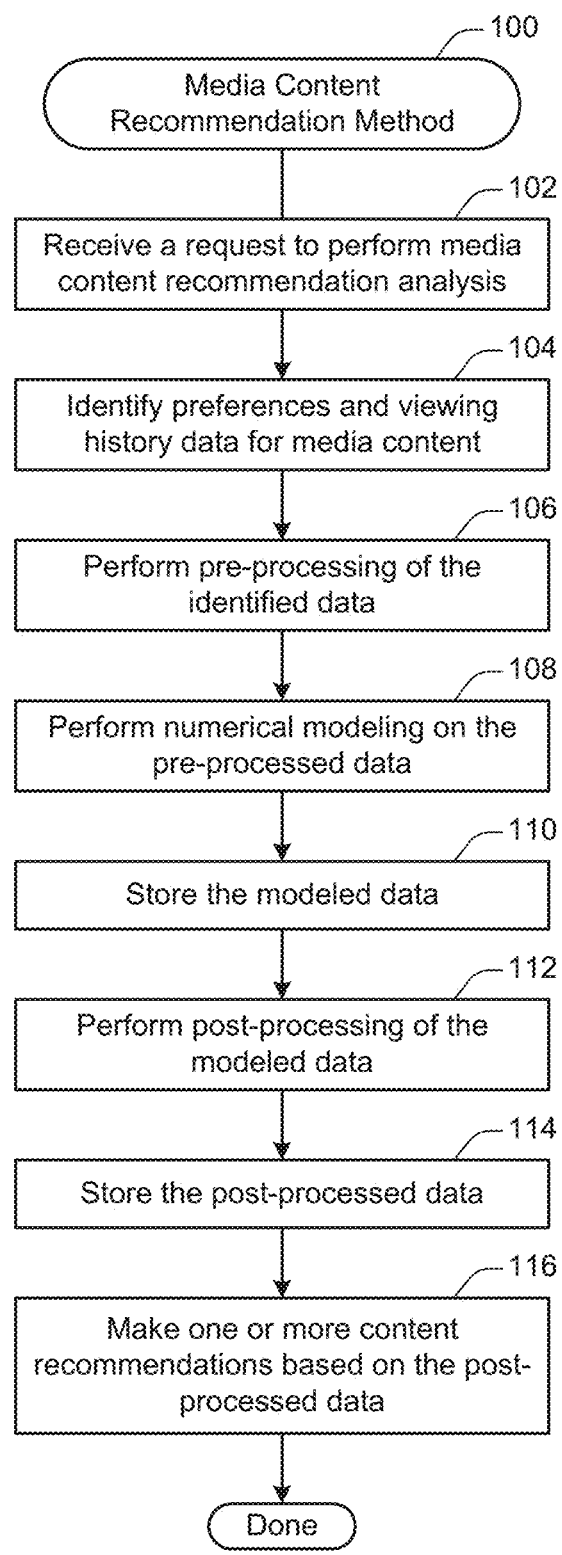
FIG. 1 illustrates an example of a method for recommending media content, performed in accordance with various techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein facilitate the recommendation of media content items. Many content recommendation engines rely upon mathematical algorithms to compute predictive models for content recommendation. The predictive models facilitate the selection of available but unviewed content items for recommendation to the user. Such selections are often based at least in part on the user's prior viewing habits. These viewing habits may at least in part reflect the performance of previously-made recommendations. According to various embodiments, the relative weight assigned to a user's media content preferences or viewing history may be affected by whether a viewed content item was recommended to the user by the recommendation system. For instance, a content item that was recommended to the user and that the user selected for viewing may be weighted more highly in order to reinforce the recommendation techniques that gave rise to the successful recommendation.

Example Embodiments

According to various embodiments, users may receive content from a content management service. The content management service may facilitate the interaction of users with various types of content services. For instance, the content management service may provide a user interface for managing and accessing content from a number of different content sources. The interface may display content received via a cable or satellite television connection, one or more on-demand-video service providers such as Netflix or Amazon, and content accessible on local or network storage locations. In addition, the interface may be used to access this content on any number of content playback devices, such as televisions, laptop computers, tablet computers, personal computers, and mobile phones.

According to various embodiments, a media content recommendation engine may include one or more algorithms or formulas for recommending content. The media content recommendation engine may, for example, compute matrix factorizations and permutations based on information such as preference and viewing history information associated with a user account. These computations may be used to match users with media content that they have not yet watched.

According to various embodiments, various types of information may be used as inputs to create media content recommendations for users. In some cases, a user may expressly indicate preferences regarding media content, such as by rating a media content item or indicating that a media content item is liked or disliked. In other cases, a user may implicitly indicate preferences regarding media content. For example, a user may exhibit a pattern of watching westerns, dramas, or programs that involve particular cast members or directors. As another example, a user may tend to request to view detailed information regarding particular types of content.

According to various embodiments, some or all of the various types of input information may be weighted based on various criteria. Weighting the input information may in some cases improve the validity and relevance of the data sets returned from increasingly large and complex series of usage statistics. Additionally, or alternately, weighting the input information may provide increasing quality of experience and better targeting of returned results from the searched data. In particular embodiments, the types of weights that may be applied to the input information may be strategically determined based on factors such as the observed behaviors of the users interacting with the system.

According to various embodiments, a weighting factor may be used to treat a data point different during numerical modeling. For example, a positive weighting factor may render a data point more significant during modeling, while a negative weighting factor may render a data point less significant. As another example, a weighting factor greater than one may render a data point more significant during modeling, while a weighting factor between zero and one may render a data point less significant. The precise effect of weighting factors may be strategically determined based on factors such as the type of numerical modeling being performed.

According to various embodiments, some or all of the various types of input information may be weighted based on whether recommendations previously made by the recommendation system were acted upon by users. For instance, the same content item may be recommended to a variety of users who have similar content viewing histories and preferences. If many of these users viewed this recommended content item, then the content item may be weighted more heavily in subsequent iterations of the recommendation procedure. However, if users did not tend to select the recommended content item for viewing, then the content item may be weighted less heavily in subsequent iterations of the recommendation procedure. By assigning higher or lower weighting to the pieces, types, categories, channels, and/or genres of recommended content that constituted successful or unsuccessful recommendations, the baseline mathematical algorithms that calculate the returned recommendation results may yield a higher percentage of more accurate and more relevant content for the viewer.

According to various embodiments, the model may be implemented in terms of percentage weighting, integer weighting, real number weighting, weighting on a range of numbers, or any other weighting scale. In particular embodiments, the model is not based on fixed weighting values, but rather is flexible and adjustable so that it can be refined and tweaked to provide improved content recommendation results over time. For instance, the relevance of returned results can be monitored and surveyed to improve the system with new data. For example, in the case of feedback-based weighting, a single view of a piece of content may yield a weighting multiplier of 1, 1.5, 2, or any other number for a viewer. Similarly, multiple views by different users may result in a weighting value for the content item of 100% relevance, 150% relevance, or any other value. Moreover, those rating values may be altered dynamically over time to improve the recommendation results.

According to various embodiments, weighting user preference and/or viewing history information based on criteria such as feedback determined based on previous recommendations may allow a media system to create more accurate content recommendations for its users. In some cases, users may experience higher levels of engagement with the media system and/or increased content consumption. In particular embodiments, user preferences may be inferred without requiring that the user expressly indicate a preference regarding a content item. For these and other reasons, users may enjoy higher levels of satisfaction with the content access and management services provided by the media system.

According to various embodiments, many content recommendation techniques involve matching a user's historical content interaction to the factorized historical interactions of other users. Based at least in part on this matching, the recommendation system may produce a list of media content items to recommend to the user. Each of the media content items in the list may be assigned a ranking relative to other items in the list. The ranking may reflect the strength of the recommendation and/or the degree of certainty with which the user is expected to enjoy the recommended media content item. For instance, a media content item that is a better match to the user's viewing history and preferences than another media content item may be assigned a relatively higher ranking.

According to various embodiments, techniques and mechanisms described herein may facilitate the adjustment of media content item rankings within a media content item recommendation list. In particular embodiments, a content recommendation technique may produce a potentially large number of rank-equivalent or approximately rank-equivalent recommendations. It is anticipated that many users, such as users with similar historical content interactions, may share similar recommendation lists that include similar sets of rank-equivalent recommendations. In such cases, the relative success of recommendations provided to users with similar or approximately rank-equivalent recommendation sets may be compared. Success for a recommendation may be based on whether the recommendation tends to be selected for playback by users, whether the recommendation meets a success criteria threshold, whether the recommended item tends to receive positive or negative reviews, or various other criteria. Recommendations that are considered successful for users provided with similar content recommendations may be increased in relative ranking in future recommendation sets for other users. Similarly, recommendations that are considered unsuccessful for users provided with similar content recommendations may be decreased in relative ranking in future recommendation sets for other users.

According to various embodiments, a media system may be implemented at least in part via a large, distributed computing environment. In general, the complexity of the recommendation procedure is positively correlated with the quality of the media content recommendations that are produced. Thus, providing accurate and timely media content recommendations that are personalized to the end-user may be a relatively costly operation from the standpoint of computing resource utilization. Providing such recommendations may involve a significant amount of data mining that requires too much information and too many computing resources to be performed at a client machine or in an offline environment. Accordingly, at least some of the recommendation process occurs when a user is not interacting with the media content service and may be based on information such as the user's prior interactions with the service as well as other users' interactions with the service.

Many of the recommendation techniques are described herein with reference to content items. The recommendation techniques described herein are widely applicable to a variety of content divisions. For example, a media content item may be an individual piece of content such as a video object. As another example, a media content item may be a standardized content channel such as a television channel or a personalized content channel created by the media system. As yet another example, a media content item may be a content category such as a genre. Also, although content may be referred to herein as video content, the techniques and mechanisms described herein are generally applicable to a wide range of content and content distribution frameworks. For example, the content may be media content such as video, audio, or image content.

FIG. 1 illustrates an example of a method 100 for recommending media content, performed in accordance with various techniques and mechanisms of the present invention. According to various embodiments, the method 100 may be performed at a media system or at any other computing system capable of performing media content analysis.

In particular embodiments, the method 100 may be used to estimate preferences for media content items. Content preferences and viewing history information associated with a user account may be combined with similar information associated with other user accounts. Then, the resulting data may be processed, analyzed, and modeled to estimate preferences for content that has not yet been presented in association with a content management account. The estimated preferences may be used to formulate recommendations for content items that a user or users associated with a content management account might like to view. One example of the type of data that may be analyzed and/or created in conjunction with the method 100 is shown in FIG. 3.

At 102, a request to perform media content recommendation analysis is received. According to various embodiments, the request may be received at a media system such as the media systems discussed with respect to FIGS. 2, 7, and 8. Alternately, or additionally, the request may be received at a different computing system such as an on-demand or cloud computing system accessible via a network such as the Internet.

According to various embodiments, the request may be generated based on any of a variety of triggering events. For example, a user may initiate a request to perform the media content recommendation analysis. As another example, the request to perform the media content recommendation analysis may be automatically generated based on a triggering event. For instance, the request may be generated when a sufficient amount of new preference or viewing history data has been received, when a sufficient number of new users are added to the system, or when a designated time period has elapsed since media content recommendation analysis has last been performed.

In particular embodiments, the request may be generated based on a scheduled or periodic triggering event. For instance, media content recommendation analysis may be performed a designated number of times (e.g., once, twice, etc.) every minute, hour, day, week, month, or any other time interval. According to various embodiments, the frequency with which media content recommendation analysis is performed may be strategically determined based on a variety of factors that may include, but are not limited to: the amount of data being analyzed, the types of data being analyzed, the computing resources available, the type of analysis being performed, the frequency with which new content is added to the system, and the quality of the resulting recommendations. For example, in some systems new content is added daily, so the method 100 may be performed on the order of once per day. In other systems, new content such as short video clips is added continuously, and at least some of the content may include time-sensitive information such as weather reports. In these systems, the method 100 may be performed more frequently.

At 104, preference and viewing history data for media content is identified. According to various embodiments, the data identified at operation 104 may include any information relevant to forming an estimate of user preferences regarding media content. The data may include, but is not limited to: content items viewed, content categories or genres viewed, dates and/or times when content was viewed, preferences expressed regarding content items, content channels, or content categories, percentages or other quantifiers for the amount of a content item that was viewed, the number of times a content item or category was viewed, a location at which a content item was viewed, and the device or devices at which a content item was viewed.

At 106, one or more operations related to pre-processing the identified data are performed. According to various embodiments, pre-processing may include any operations related to selecting, filtering, sorting, updating, weighting, analyzing, or otherwise treating the data prior to the performance of the primary numerical modeling used to estimate preferences. For instance, pre-processing may involve weighting the viewing history and content preference data by time, by a number of views, by percent-consumed, and/or by other factors. One example of a method for pre-processing is described with respect to FIG. 4.

In particular embodiments, pre-processing the identified data may be used to emphasize a particular attribute or attributes for relevance. For instance, viewer preferences regarding some types of media content items such as news reports may be sensitive to time of day. That is, users may wish to view news reports in the morning or evening, but not during the middle of the day. Accordingly, pre-treating may be used to emphasize an attribute of the viewing data, such as time of day, that may be particular relevant in some or all contexts.

At 108, numerical modeling is performed on the pre-processed data. According to various embodiments, the numerical modeling may analyze the pre-processed data to estimate preferences for content. In particular embodiments, preferences may be estimated for content items that have not yet been presented in association with a content management account. Alternately, or additionally, preferences may be estimated for content that has been presented, such as content that has been viewed but that was not rated. In many systems, numerical modeling is a computationally complex task that requires a relatively large amount of computing resources. For instance, numerical modeling may require the computation of matrix operations for large matrices or other such time-consuming tasks.

According to various embodiments, various types of numerical modeling may be performed. The modeling techniques may include, but are not limited to: log-likelihood techniques, Pearson correlation, Rocchio Relevance Filtering, k-nearest neighborhood, Slope One, collaborative filtering techniques, content-based filtering techniques, hybrid recommender techniques, Bayesian Classifiers, cluster analysis, Alternative Least Squares with Weighted Lambda Regularization, Restricted-Boltzman Machines-Gradient Boosted Decision Trees or other types of decision tree techniques, and artificial neural networks. The choice of modeling techniques may depend on factors such as the type of data being analyzed and the type of analysis being performed. In particular embodiments, modeling techniques may be strategically determined based on the factors such as the relative efficacy of different techniques when applied to a particular media system, user base, and/or data set.

At 110, the modeled data is stored. According to various embodiments, the modeled data may be stored on a storage medium within or accessible to the media system. The modeled data may be stored so that it may be retrieved to provide content recommendations and/or to perform post-processing of the modeled data. In particular embodiments, different types of post-processing may be performed on a modeled data set. Accordingly, the modeled data may be stored so that it can be retrieved separately for performing different types of post-processing.

At 112, post-processing of the modeled data is performed. According to various embodiments, post-processing of the modeled data may include any operations related to selecting, filtering, sorting, updating, weighting, analyzing, or otherwise treating the data after the performance of the primary numerical modeling used to estimate preferences.

In particular embodiments, post-processing of the modeled data may be performed to update or edit the data for providing feedback for the next iteration of the media content recommendation process 100. For instance, new media content preferences or viewing history information may be received. This information may be used to update the data identified at operation 104. Alternately, or additionally, the new information may be used to check the validity of the recommendations produced by the numerical modeling or post-processing operations. For example, a user may view and/or indicate a preference for a media content item recommended to the user. This information may be used as positive feedback, positively reinforcing the process or data that led to the recommendation. As another example, a user may not view or may indicate a preference against a media content item recommended to the user. This information may be used as negative feedback, negatively reinforcing the process or data that led to the recommendation.

In particular embodiments, post-processing of the modeled data may be performed to provide updated recommendations based on new information. For instance, new viewing history or content preference information may be received after numerical modeling is performed at operation 108 but before the method 100 is performed again. As discussed herein, numerical modeling is in many systems a computationally complex task that requires a relatively large amount of computing resources. Post-processing may allow the recommendation system to provide updated recommendations based on new information without incurring the relatively large computational costs associated with full numerical modeling of the data set. For example, post-processing may involve numerical modeling that uses as input a limited subset of data rather than a complete data set. As another example, post-processing may involve a simpler form of numerical modeling that is less computationally intense than that employed in operation 108.

In particular embodiments, post-processing of the modeled data may be performed to provide media content recommendations for new users of the recommendation system. For example, the recommendation method 100 may be performed on a daily basis. After the method is performed, a new user may join the system and view several pieces of content in the first day, before the next iteration of the recommendation method 100. In this case, post-processing may be used to provide the new user with content recommendations even before the next iteration of the recommendation method 100. Because the post-processing recommendation process may be less complete than the full numerical modeling performed at operation 108, the post-processing procedure may provide provisional recommendations that are improved upon by the next iteration of the numerical modeling process.

In particular embodiments, post-processing of the modeled data may be performed to provide media content recommendations for different viewing patterns associated with a single content management account. In one example, a content management account may be used by different members of the same family. The father may use the account to view sporting events, while children may use the account to view Disney movies. Accordingly, the recommendation engine may recommend a variety of media content items that reflect the family members' varied tastes in content. These recommendations may be refined via post-processing based on recent viewing history. For instance, if the account is being used to watch a basketball game, then the recommendations shown after the basketball game is viewed may be for other sporting events. If instead a pattern of Disney movie viewing is detected, then post-processing may be used to refine the media content recommendations to select those that match this viewing pattern.

In another example, a viewing pattern associated with a content management account may change abruptly. For instance, the content management account may be primarily used to view content typically enjoyed by adults, such as sporting events and news broadcasts. However, the viewing pattern may suddenly change to cartoons, such as when an adult hands a content playback device such as a tablet computer to a child. Even though this viewing pattern does not match the pattern associated with the content management account, post-processing may be used to recommend other content related to these recent viewing choices, such as other cartoons.

At 114, the post-processed data is stored. According to various embodiments, the storing of the post-process data may be substantially similar to the storing of the modeled data discussed with respect to operation 110. The post-processed data may be stored in any way that makes it accessible to the recommendation for providing content recommendations and performing other analysis. The post-processed data may include, for potentially many different content management accounts, estimated preferences for potentially many different media content items. One example of the type of data that may be analyzed, created, and stored in conjunction with the method 100 is shown in FIG. 3.

At 116, one or more content recommendations are made based on the post-processed data. According to various embodiments, the content recommendations may be provided to a client machine associated with a content management account. The content recommendations may be personalized according to the viewing history and content preferences of the content management account. The recommended content may be available via any content source that is accessible to the content management account. In particular embodiments, the recommended content may be available for presentation at any of a variety of content playback devices associated with the content management account.

According to various embodiments, content recommendations may be made based on one or more of a variety of factors. For example, content may be selected based on an estimate of the degree to which the content matches the viewing history and content preferences of the content management account, as discussed with respect to operations 102-114. As another example, more time-sensitive content such as live sporting events may be more likely to be selected than less time-sensitive content such as old movies.

According to various embodiments, one or more of the operations shown in FIG. 1 may be omitted. For example, in some instances pre-processing or post-processing of the data may be omitted. As another example, in some instances modeled data may not be stored separately from post-processed data.

Figure 2:
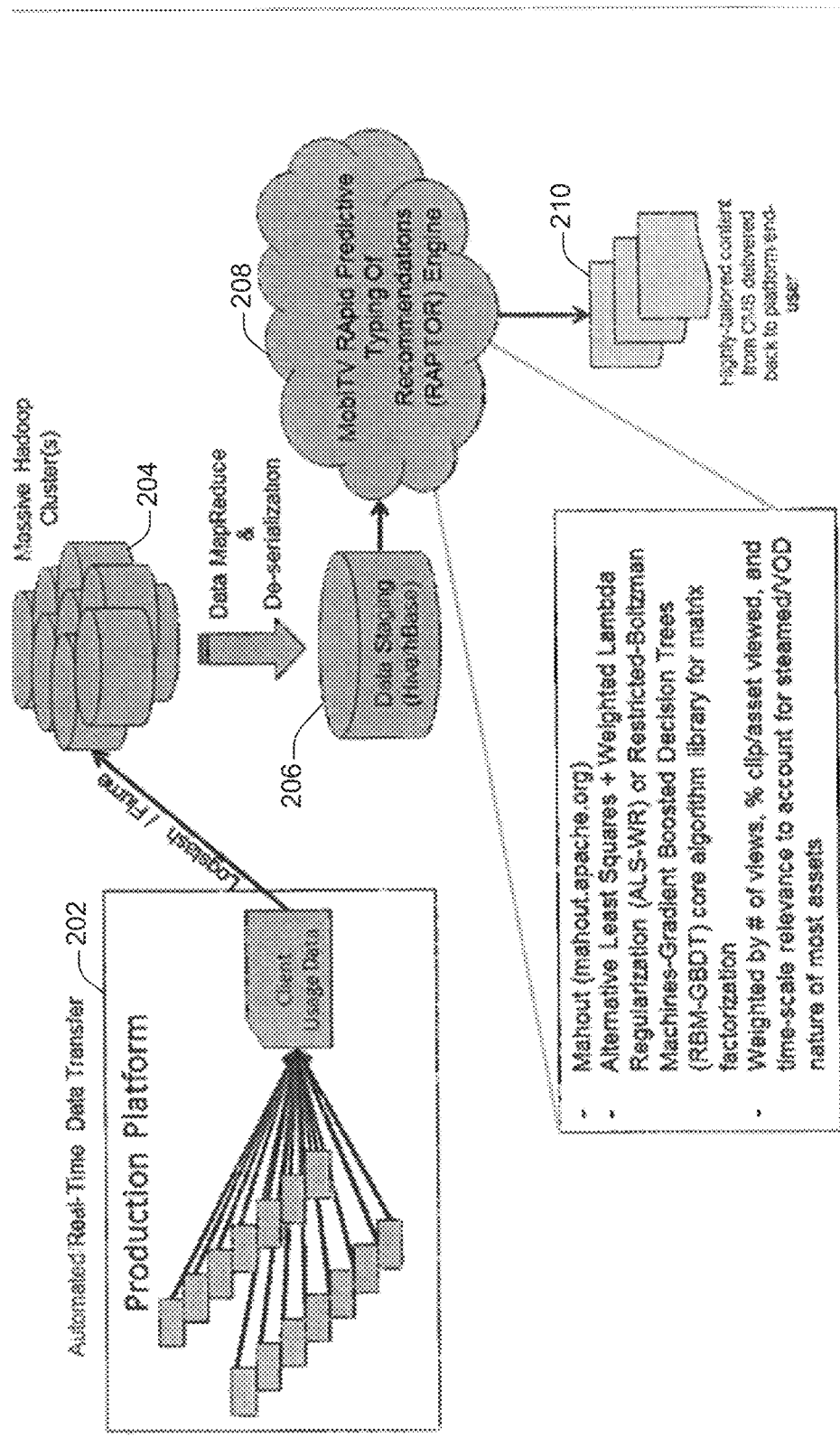
FIG. 2 illustrates an example of a system that can be used with various techniques and mechanisms of the present invention.

FIG. 2 illustrates an example of a system 200 that can be used with various techniques and mechanisms of the present invention. According to various embodiments, the system shown in FIG. 2 is a recommendation system that may be used to receive, analyze, and process data for providing media content recommendations. The system 200 includes a production platform 202, Hadoop clusters 204, a data storage system 206, a recommendation engine 208, and content items 210. The system 200 is presented at an abstract level, and many hardware and software components that may be present in a recommendation system are omitted for clarity. Various hardware and software components of systems, including components that are not shown in FIG. 2, are discussed with respect to FIGS. 7 and 8.

According to various embodiments, the production platform 202 is used to provide media content for presentation in association with many different content management accounts, each of which may be associated with potentially many different content playback devices. The production platform 202 may also be used to collect and aggregate client usage data. The client usage data may identify media content preference and viewing history information associated with the presentation of the content. For instance, when a user views a media content item, indicates a liking or disliking of a media content item, or selects a recommended content item for presentation, such information may be stored for analysis.

According to various embodiments, the one or more Hadoop clusters at 204 constitute a distributed computing system that allow potentially many different computers to coordinate while analyzing a potentially very large data set. The Hadoop clusters may be used to perform various types of data analysis such as MapReduce and deserialization. Although the system 200 uses Hadoop clusters, other recommendation systems may employ other hardware and/or software frameworks for data analysis. These frameworks may include, but are not limited to: columnar oriented database systems such as Cassandra, commercial large data systems such as Teradata, and open source relational databases such as Postgres.

According to various embodiments, the data staging system 206 may be used to store data for use in conjunction with the Hadoop clusters 204. For instance, the data staging system 206 may store an HBase database in a Hive data warehouse system. Alternately, the data staging system 206 may employ a different data storage and/or management system.

According to various embodiments, the recommendation engine 208 may be used to process the staged data for providing media content recommendations. The recommendation engine 208 may be used to perform any of a variety of operations related to recommendation. For example, the recommendation engine 208 may be used to perform a machine learning algorithm such as an algorithm performed via the Apache Mahout framework. As another example, the recommendation engine 208 may be used to perform numerical modeling, as discussed with respect to operation 106 shown in FIG. 1. As yet another example, the recommendation engine 208 may be used to perform pre-processing operations such as weighting viewing history and/or content preferences by a number of views, by a percentage or amount of a content item that was viewed, by the date or time when a content item was viewed, or by some other factor.

According to various embodiments, the content recommendations at 210 may be selected based on the analysis performed at the recommendation engine 208 or elsewhere in the recommendation system. The content recommendations may be provided to a user of a content playback device associated with a content management account. Based at least in part on the content recommendations, a user may select content for presentation on the content playback device or on another device. Providing content to the content playback device may be performed via the production platform 202. Additionally, information regarding media content preferences and viewing history related to the content recommendations provided at 210 may be stored as client usage data in the production platform 202 and used to provide updated media content recommendations.

FIG. 3 illustrates an example of a media content preference data and recommendation chart 300. According to various embodiments, the chart 300 includes information regarding media content preferences and viewing history for various user accounts. The chart 300 includes the content item columns 304-310, the user account column 302, the user account rows 312-320, and the content preference data cells 322 and 324.

According to various embodiments, the user account column 302 includes identifiers for user accounts. User accounts are also referred to herein as content management accounts. Each user account may be associated with one or more users of a content management system. Although only five user accounts are shown in FIG. 5, an actual data set may include any number of user accounts. For instance, many data sets include hundreds of thousands or millions of different accounts.

According to various embodiments, the content item columns 304-310 are each associated with a different media content item or content category. Each of the media content items may be analyzed by the recommendation system for the purposes of providing recommendations to the user accounts. In particular embodiments, not all of the media content items may be available to each user account. For instance, users of the media recommendation system may receive content from different sources, such as broadcast television and on-demand services such as Netflix. In this case, some users may have access to some content sources but not to other content sources.

According to various embodiments, each of the user account rows 312-320 includes a number of content preference data cells that correspond to different content items. Content preference data cells may be used to store any of various types of information. This information may include, but is not limited to: expressed preferences regarding a content item (e.g., a number of stars), a percent consumed of a content item, a location at which a content item was viewed, a date or time at which a content item was consumed, and a number of times that a content item was viewed.

According to various embodiments, various types of values may be stored within each of the media content data cells. For example, the data cell 322 stores a "1", which may indicate an expressed preference, a percent consumed, or some other viewing history or content preference information related to the first content item 304. As another example, the data cell 324 is blank, indicating that the content item has not yet been viewed in association with the fourth user account 318. As yet another example, data cells may be updated to include estimated values calculated by the media recommendation system.

According to various embodiments, the media recommendation system may calculate estimated values for any or selected ones of the blank data cells. For instance, the media recommendation system may calculate estimated values for all blank data cells associated with a user account, for all blank data cells associated with a user account, for all blank data cells associated with content items to which a user account has access, or for any other set of data cells.

According to various embodiments, media content preference and recommendation data may appear significantly different than the chart 300 shown in FIG. 3. For instance, in some techniques, specific data value estimates may be created for unviewed content items. Alternately, or additionally, data value estimates may be stored as differences between pairs in a sparse matrix, which may facilitate the rapid calculation of data value estimates for newly added content items.

Figure 4:
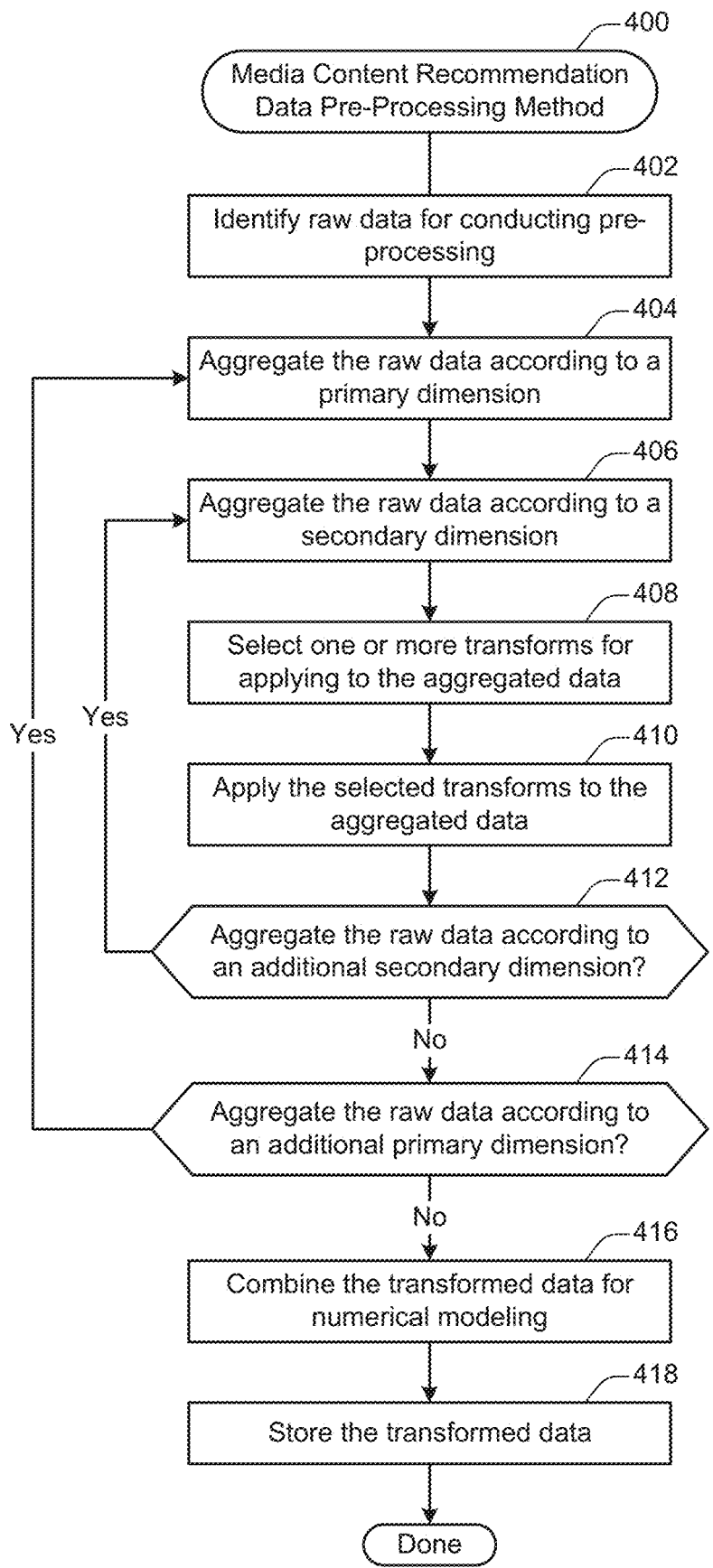
FIG. 4 illustrates an example of a method for pre-processing media content recommendation data.

FIG. 4 illustrates an example of a method 400 for pre-processing media content recommendation data. According to various embodiments, the method 400 may be performed at a media system. The method 400 may be initiated when a request to pre-process data is generated, as discussed with respect to operation 106 in FIG. 1. The method 400 may be used to weight, filter, sort, aggregate, analyze, or otherwise process content preference and viewing history data prior to performing numerical analysis.

At 402, raw data for conducting pre-processing is identified. According to various embodiments, various types of data may be analyzed. For instance, the raw data may be similar to that discussed with respect to FIGS. 1 and 3. That is, the raw data may identify viewing history or content preference information associated with potentially many different content management accounts. Each content management account may be associated with different data for potentially many different content items or content categories that have been viewed in association with the account.

At 404, the raw data is aggregated according to a primary dimension. According to various embodiments, the primary dimension may be an attribute or view of the data that is selected for emphasizing. For instance, the primary dimension may be a number of views of a content item, a percentage of a content item that has been viewed, or a weighting factor to be applied based on the secondary dimension. At 406, the raw data is aggregated according to a secondary dimension. According to various embodiments, a variety of dimensions may be used for either the primary or secondary dimensions. These dimensions may include, but are not limited to: a distance in the past that the viewing occurred, a number of views, a percentage viewed, an absolute or relative geo-location, a time of day, whether the content item viewed was recommended by the recommendation system, or any other relevant dimensions.

Figure 5A:
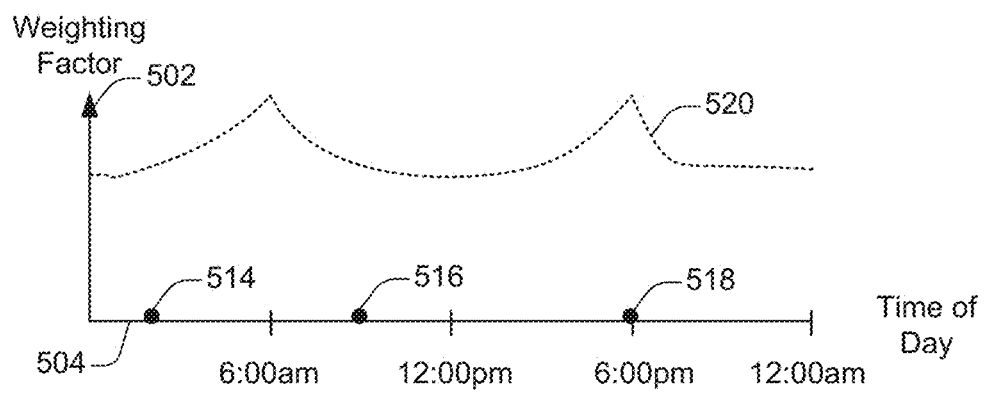
FIGS. 5A-5C illustrate examples of charts depicting pre-treated data.
Figure 5B:
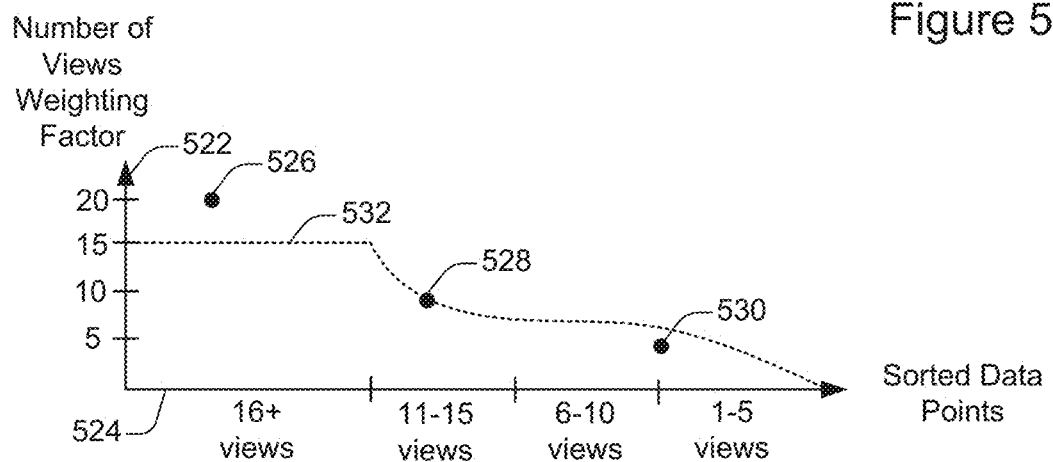

In particular embodiments, the primary and secondary dimensions may be thought of as axes of a graph, such as the graphs shown in FIGS. 5A and 5B. In this case, the primary dimension may be analogous to the y-axis on the graph, while the secondary dimension may be analogous to the x-axis on the graph. Each data point on the graph may represent a viewing event. Each viewing event may identify a content item viewed as well as the content management account associated with the viewing event. The data points may then be located on the graph according to the primary and secondary dimensions. When the secondary dimension includes a weighting factor to be applied based on a value associated with the primary dimension, as is the case in time of day analysis, then each data point may be positioned at a respective location on the x-axis, as shown in FIG. 5A. When instead the primary dimension includes a non-zero data value, such as a number of views greater than zero, then each data point may be located at a position above the x-axis, as shown in FIG. 5B.

In a first example, the primary dimension may be a weighting factor and the secondary dimension may be a time of day that a content item was viewed. In this case, each data point may identify a particular content item presented to a particular user account. These data points may be sorted At 408, one or more transforms for applying to the aggregated data are selected. According to various embodiments, the transforms may be selected to emphasize an attribute or quality of the aggregated data. Each transform may be a mathematical alteration or adjustment to the aggregated data values. For instance, a transform may impose a maximum or minimum value, a linear transformation, an affine transformation, a quadratic or other polynomial transformation, or any other type of transformation.

In particular embodiments, transformations may be strategically determined based on their efficacy in producing reliable recommendations. For instance, once a number of views for a content item exceeds a designated threshold value, the view count may cease to be a helpful indicator of the strength of the preference and may instead unduly weight the recommendations toward the viewed content item. In this case, a transform may cap the number of views at the designated threshold, thus reducing the problem of excessive weight being given to the content item in the numerical modeling phase.

At 410, the selected transforms are applied to the aggregated data. According to various embodiments, applying the selected transforms may involve conducting a numerical operation on the aggregated data to adjust it in accordance with the selected transforms. The transforms may be applied sequentially or all once. In particular embodiments, the order for applying the transforms may be strategically determined based on the efficacy of the ordering in producing reliable estimates.

At 412, a determination is made as to whether to aggregate the raw data according to an additional secondary dimension. At 414, a determination is made as to whether to aggregate the raw data according to an additional primary dimension. According to various embodiments, data may be aggregated according to various numbers of primary and secondary dimensions. For instance, content items may be aggregated and transformed first by time of day and then by geo-location to separately emphasize both of these attributes or qualities.

At 416, the transformed data is combined for numerical modeling. According to various embodiments, combining the transformed data may be performed to unify the transformations performed in FIG. 4. For example, a particular content rating may have been scaled down because the content was viewed long in the past. At the same time, the same content rating may have been scaled up because it was viewed at a particular time of day. As another example, different dimensions may matter differently at different times of the day, different geo-locations, different relative locations, or according to differences in other factors. Combining the transformed data may involve reconciling these operations to produce a unified data set that can be modeled effectively.

At 418, the transformed data is stored. According to various embodiments, the transformed data may be stored in a way that makes it accessible for performing numerical modeling, as discussed in relation to FIG. 1. For instance, the transformed data may be transformed in a database located in a data staging system, as discussed in relation to FIG. 2.

According to various embodiments, various choices involved in data pre-processing may depend on the factors such as the specific media system, data set, and user base being analyzed. For instance, the dimensions along which to aggregate data, the transforms to apply to the aggregated data, the order in which to apply the transforms, and the techniques used to store and blend the transformed data may each vary according to various factors. Accordingly, the specific choices for these techniques may be strategically determined based on a variety of factors to improve the efficacy of the recommendation process.

Figure 5C:
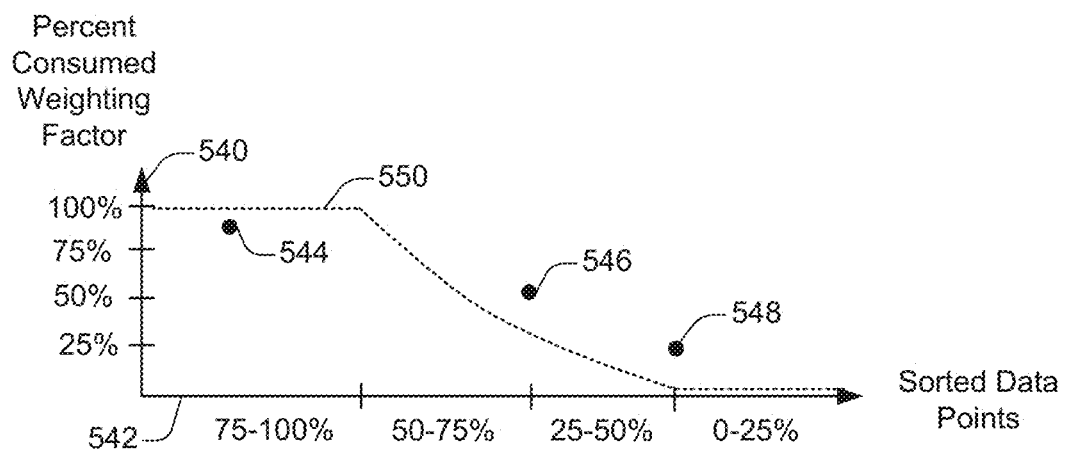

FIGS. 5A-5C illustrate examples of charts depicting pre-treated data. According to various embodiments, the charts shown in FIGS. 5A-5C may depict the type of weighting operations that may be performed during pre-processing, as discussed with respect to FIG. 4. In particular embodiments, the axes shown on the graphs in FIGS. 5A-5C may correspond to dimensions identified in operations 404 and 406 shown in FIG. 4.

According to various embodiments, each of the data points shown in FIGS. 5A-5C may identify at least a media content item and a content management account. In some cases, data points may identify other information, such as a number of views associated with the content item, a percent of the content item that has been consumed, a time of day that the media content item was viewed, or any other information. For the purposes of illustration, it will be assumed that each of the data points shown in FIGS. 5A-5C is associated with the same content management account.

These charts are presented in order to better elucidate various techniques and mechanisms described herein and need not be actually produced during the recommendation process. Additionally, the data presented on the charts are significantly simplified in comparison with actual data in most recommendation systems. For instance, each of the charts shown in FIGS. 5A-5C includes three data points, while data sets used in many recommendation systems may include hundreds of thousands or even hundreds of millions of data points.

In addition, the pre-processing and transformations shown in FIGS. 5A-5C are only simple examples of the types of pre-processing and transformations that may be performed in accordance with techniques and mechanisms described herein. Specific transformations may in many cases be much more complex. Also, transformations may be strategically determined based on a number of factors, including but not limited to the efficacy of specific transformations in producing reliable recommendations for a given media system, user base, and data set.

In FIG. 5A, the data points are aggregated and weighted by time of day. The chart shown in FIG. 5A includes a Y-axis 502, an X-axis 504, data points 514-518, and a transform 520. FIG. 5A shows an arrangement of the data points and the result of the transformation of the data by a transform function, as discussed with respect to operation 410 shown in FIG. 4.

The chart shown in FIG. 5A corresponds to a transformation applied to news-related content items. It is anticipated that news-related content items may be time-sensitive in nature. That is, many users may tend to regularly view preferred news-related content such as news broadcast television programs in the morning or evening. In contrast, when users view news-related content at other times, the content may simply reflect some topical interest that does not reflect a strong preference for the content. Accordingly, it is anticipated that news programs viewed during the morning and evening may better reflect a user's preferences and tastes than news-related content viewed at other times. The transform shown in FIG. 5A may be used to adjust the weighting of content to reflect this anticipated preference pattern.

In particular embodiments, the data points included in a particular transformation need not include all data points available to the system or all data points associated with particular content management accounts. For instance, the transformation shown in FIG. 5A is directed primarily to news-related content, since other content may not reflect time-sensitive preferences in quite the same fashion. Accordingly, the transformation shown in FIG. 5A may be applied to news-related content items but not to other content items.

Each of the data points 514-518 represents a viewing event. Each data point identifies a media content item that was viewed, a content management account that was associated with the viewing, and a time of day that the media content item was viewed. In some cases, each data point may identify additional information. However, not all information associated with each data point is shown in FIG. 5A.

The X-axis 504 represents a time of day at which a content item associated with a data point was viewed. For instance, the media content associated with the data point 514 was viewed in the early morning, around 2:00 am. The media content associated with the data point 516 was viewed in mid-morning, around 9:00 am. The media content associated with the data point 518 was viewed in the early evening, at 6:00 pm.

The Y-axis 502 represents a weighting factor that is assigned by a transform. Prior to transformation, the different data points shown in FIG. 5 were weighted equally and thus treated as having equal significance. That is, each of the views of content items are treated equally when estimating user preferences and identifying unviewed content to recommend for viewing in association with the content management account. After the transformation, different data points may be weighted differently. For instance, in FIG. 5A, content items that were viewed around 6:00 A.M. and 6:00 P.M. may be treated as more significant than other content items.

In FIG. 5B, the data points are aggregated and weighted by the number of times that each content item has been viewed. The chart shown in FIG. 5B includes the X-axis 522, the Y-axis 524, the data points 526-530, and the transformation 532. FIG. 5B shows an arrangement of the data points and the result of the transformation of the data by a transform function, as discussed with respect to operation 410 shown in FIG. 4.

The chart shown in FIG. 5B represents a view-weighted transformation. It is anticipated that a user who views one content item many times typically prefers it to another content item that the user views only once. Accordingly, the significance of a user's viewing of a content item in the recommendation engine may be weighted by the number of times that the user has viewed the content. For instance, an initial weighting factor may weight each content item by the number of times it was viewed. However, such a weighting may in some instances result in skewed inferences regarding user preferences. For instance, if a user views a content item such as a television news program or a humorous web video clip 60 times, a simple linear weighting factor may unduly skew the results toward content that is similar to the frequently-viewed content. Accordingly, a transformation may be applied that adjusts the weighting factor. For instance, the transformation function may cap the weighting factor at the high and and/or make other adjustments to the weighting factor.

Each of the data points 526-530 represents a viewing event. Each data point identifies a media content item that was viewed, a content management account that was associated with the viewing, and a number of times that the media content item was viewed. In some cases, each data point may identify additional information. However, not all information associated with each data point is shown in FIG. 5B.

In particular embodiments, a media content item need not be an individual media content object such as a video. Instead, a media content item may be a television program, a content channel such as a television channel, or a content genre. Thus, an data point indicating that a media content item was viewed 20 times, for instance, may represent the repeated viewing of a news program or a television channel and not necessarily the repeated viewing of a single media content object. In particular embodiments, the scope of a data point may be changed and/or strategically determine to accommodate various recommendation applications.

The X-Axis 524 represents a number of views associated with each data point. For instance, the data point 526 is associated with a media content item that has been viewed 20 times, the data point 528 with a media content item that has been viewed 10 times, and the data point 530 with a media content item that has been viewed 5 times.

The Y-axis 522 represents a weighting factor that is affected by a transformation. Initially, the weighting factor for a given data point in FIG. 5B is the number of views associated with the content item represented by the data point. For instance, if a media content item is viewed 20 times, then it is assigned a weighting factor of 20, whereas a media content item that has been viewed once would be assigned a weighting factor of 0.

The transformation 532 is applied to the data points to adjust the weighting factors. Initially, the transformation 532 caps the weighting factor that can be applied to any data point at 15. That is, a user may continue to view a media content item more than 15 times, but the view-weight that is applied to the data point does not exceed 15. The transformation 532 then does not affect the weight associated with the data point 528, while it increases the weighting factor associated with the data point 530.

In FIG. 5C, the data points are aggregated and weighted by the percentage of each content item that has been presented. The chart shown in FIG. 5C includes the X-axis 542, the Y-axis 540, the data points 544-548, and the transformation 550. FIG. 5C shows an arrangement of the data points and the result of the transformation of the data by a transform function, as discussed with respect to operation 410 shown in FIG. 4.

The chart shown in FIG. 5C reflects a percent consumed weighted transformation. It is anticipated that a viewer who views a greater percentage of one content item than another typically, and generally, prefers the first content item to the second. Accordingly, the significance of a data point in a recommendation system may be weighted according to the percentage of the associated content item that was presented to a user. However, it is anticipated that some differences in percentage viewed do not reflect differences in preferences. For instance, the final portion of some content items includes a credits sequence. For this and other reasons, some viewers may simply choose not to view the final portion of a content item. Thus, a viewer who watches 100% of one content item while only viewing 95% of another content item may not actually prefer the first content item to the second. Accordingly, a transformation may be applied to adjust the weighting values to reflect this and other user preferences patterns.

Each of the data points 544-548 represents a viewing event. Each data point identifies a media content item that was viewed, a content management account that was associated with the viewing, and a percentage or portion of the media content item that was viewed or presented. In some cases, each data point may identify additional information. However, not all information associated with each data point is shown in FIG. 5C.

The X-Axis 542 represents a percentage or portion of a content item that was viewed or presented. For instance, the data point 544 is associated with a media content item of which 85% was viewed, the data point 546 with a media content item of which 50% was viewed, and the data point 548 with a media content item of which 25% was viewed.

The Y-axis 544 represents a weighting factor that is affected by a transformation. Initially, the weighting factor for a given data point in FIG. 5B is the percentage of the content item represented by the data point that was presented in association with the content management account. For instance, if 100% of a media content item is presented, then it is assigned a weighting factor of 1, whereas a media content item of which only 25% has been viewed once would be assigned a weighting factor of 0.25.

The transformation 550 is applied to the data points to adjust the weighting factors. Initially, the transformation 550 scales up the weighting factor for media content items for which 75-100% of the item has been presented. That is, if 75-100% of a media content item is presented, then a weighting factor of 1 will be applied, effectively treating the media content item as if 100% of the item had been presented. Accordingly, the weighting factor for the data point 544 is scaled up to 100%. This part of the transformation reflects the idea that if a viewer watches nearly all of a media content item, he or she may be inferred to like it, and that small differences in high viewed percentages likely do not reflect differences in preferences.

Then, the transformation 550 scales the weighting factors for other data points, such as the data point 546. The data point 546 is associated with a content item of which 50% has been viewed, and its weighting factor is scaled down somewhat. This part of the transform reflects the idea that a viewer who stops viewing a content item halfway through may be estimated to have a relatively weak preference for the content item.

Finally, the transformation 550 scales down the weighting factor for media content items for which 0-25% of the item has been presented. For instance, the data point 548 is associated with a media content item of which 25% has been viewed. However, the weighting factor for the media content item is scaled down from 0.25 to 0. This part of the transformation reflects the idea that when a user watches very little of a media content item and then stops viewing it, the viewer may be inferred to not like the content item. Accordingly, small differences in the percentages of content items for which viewing is quickly terminated may not matter in the calculation of new recommendations.

Figure 6:
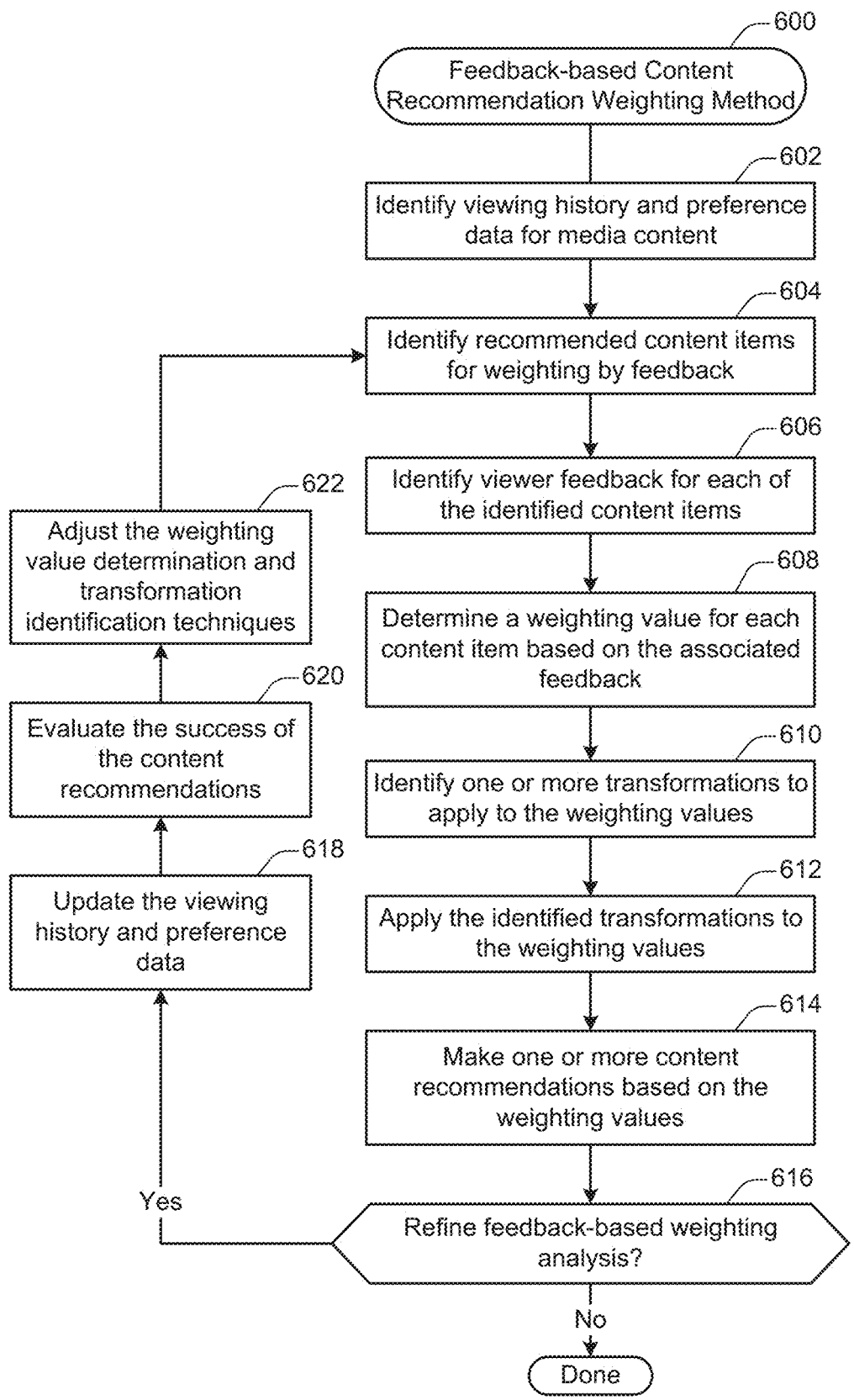
FIG. 6 illustrates an example of a method for providing feedback-based weighting content recommendations.

FIG. 6 illustrates a method 600 for providing feedback-based weighting content recommendations. According to various embodiments, a higher weighting may be assigned to the pieces, types, categories, channels, and/or genres of content that have been viewed after being recommended to viewers. In this way, the baseline mathematical algorithms that calculate the returned recommendation results may yield a higher percentage of more accurate and more relevant content for the viewer.

According to various embodiments, the method 600 may be used to positively and/or negatively reinforce various portions of the recommendation procedure. For instance, if a particular content recommendation is successful, then the significance of the recommended content item may be boosted during a subsequent iteration of the recommendation procedure. However, if a particular content recommendation is unsuccessful, then the significance of the recommended content item may be reduced during a subsequent iteration of the recommendation procedure.

According to various embodiments, the success or failure of a recommendation may be determined in any of various ways. For example, a recommended content item that is selected for viewing by a user may be counted as a success. As another example, a recommended content item that is selected and viewed to at least a designated percentage of completion (e.g., 60%) may be counted as a success. However, a recommended content item that is selected for viewing but only a small portion of which is actually viewed (e.g., less than 30%) may be counted as a failure. As yet another example, a recommended content item that is selected for viewing by a relatively large number of users may be counted as a success. In particular embodiments, the success or failure of a recommendation may be strategically determined based on factors such as which types of recommendations are helpful for providing reinforcement to the recommendation system and how user actions tend to correspond to user preferences.

According to various embodiments, feedback received regarding an activated recommendation may be used in various ways by the recommendation system. For example, the feedback may be used to add or remove a cap or limit on a weighting value applied to a content item. As another example, the feedback may be used to increase or decrease a weighting value applied to a content item. As yet another example, the feedback may be used to act as a multiplier to a weighting value created based on another factor, such as a percentage viewed or a view count. As still another example, the feedback may be used as input to a weighting value function based on any of various factors. For instance, an activated recommendation may be used to generate a weighting value for a content item based on the percentage of the recommended content item that was viewed.

According to various embodiments, the method 600 may be used to reinforce the recommendation process for users exhibiting similar viewing history and preference data. For instance, a content item may be recommended to a group of viewers exhibiting similar tastes. If the recommendation proves to be successful with the original group of viewers, then it may be provided to a larger group of viewers. However, if the recommendation does not succeed, then it may be deemphasized in subsequent iterations of the recommendation procedure.

According to various embodiments, operations shown in the method 600 may be performed at various stages in the recommendation process. For example, some operations may be performed during the post-processing of modeled data discussed with respect to operation 112 shown in FIG. 1. For instance, user feedback for recommendations that have been acted upon may be stored for further analysis. As another example, some operations may be performed during the pre-processing of preference and viewing history data described with respect to operation 106. For instance, weighting values may be applied to the data points associated with the user feedback.

According to various embodiments, the method 600 may be performed at a media system, such as the systems discussed with respect to FIG. 2 and FIGS. 7-9. The method 600 may be performed in conjunction with a pre-processing method, such as the method 400 discussed with respect to FIG. 4. For example, various operations discussed in FIG. 6 may act as elaborations or specific instances of operations discussed with respect to FIG. 4. As another example, various operations discussed with respect to FIG. 6 may be performed in addition to, or instead of, operations discussed with respect to FIG. 4. Alternately, or additionally, the method 600 or various portions thereof may be performed during a post-processing operation such as that discussed with respect to operation 112 in FIG. 1.

At 602, viewing history and preference data for media content is identified. According to various embodiments, the identification of viewing history and preference data at operation 602 may be substantially similar to the identification of such information at operations 104 and 402 discussed with respect to FIGS. 1 and 4. The viewing history and preference data may include information identifying a number of views, a time viewed, and/or a percentage viewed for content items presented in association with content management accounts.

According to various embodiments, the viewing history and preference data may identify whether a content item was previously recommended to a viewer. For instance, a content item may be selected for recommendation during a previous iteration of the media content recommendation method 100 shown in FIG. 1. Then, the recommendation may be presented to the viewer in a user interface. In some instances, a recommendation may be acted upon by a user. For instance, a user may select the recommended content item for presentation on a content device. The user may then view the entire content item or only a portion of the content item. Such information may be used to positively or negatively reinforce the recommendation procedure.

For example, the viewing history and preference data may include a data point indicating that a particular content item was recommended to a viewer and that the viewer selected the content item for presentation. The data point may also indicate information such as whether the entire content item was presented or whether only a portion of the content item was presented. When only a portion of the content item was presented, the data point may identify a portion of the content item that was presented, such as 10% or 65%.

At 604, content items are identified for weighting by feedback. A content item identified for weighting by feedback may be any individual media object, media category or genre, or media channel capable of being analyzed by the recommendation system. For example, a media content item may be an individual piece of content such as a video object. As another example, a media content item may be a standardized content channel such as a television channel or a personalized content channel created by the media system. As yet another example, a media content item may be a content category such as a genre.

In particular embodiments, an activated recommendation may be required to meet a designated feedback data threshold value before being used for recommendation engine reinforcement purposes. For example, the designated feedback data threshold may be a percent completed of at least 40% or a time viewed of at least 20 minutes. As another example, the threshold may specify a proportion of viewers who selected the content, such as at least 25% of viewers who were provided with the content recommendation. In particular embodiments, the designated threshold may be the same for each content item included in a condition. Alternately, different content items may be associated with different thresholds.

According to various embodiments, various criteria may be used for selecting content items to weight by feedback. These criteria may include, but are not limited to: whether a recommended content item was selected by a user, whether a recommended content item is associated with user feedback, whether a content item has been expressly rated by a user, whether a content item falls under a given category or genre, whether a content item meets a designated length threshold, and whether a content item is of a particular content item type.

In particular embodiments, some types of content items may be suitable for weighting by feedback, while others may not be. For example, content items such as movies or television programs may be suitable for weighting by view count. That is, a recommendation for a movie that is selected for viewing by a user and of which a large percentage is presented to the user may be counted as a successful recommendation. In this case, and the recommendation procedure that led to the recommendation may be reinforced. As another example, some types of content items such as a topical news program may be less suitable for feedback-based recommendation. For instance, a user may select the program based on the topics featured rather than a preference for the particular news program.

In particular embodiments, content items may be selected based at least in part on whether a user has expressly rated the content item. For instance, if a user expresses a preference of three out of a total of five possible "stars" for a content item, then user may be said to not have expressed a strong preference for or against the content item. Accordingly, weighting the feedback to reinforce the recommendation procedure may be unnecessary. However, if the user expresses a strong preference for or against a content item, the user's preference may be treated as feedback for positively or negatively reinforcing the usage of the content item in the recommendation techniques that gave rise to the recommendation.

At 606, viewer feedback for each of the identified content items is identified. According to various embodiments, the viewer feedback may identify any information indicating a user response to a content item. For example, the viewer feedback may identify a percentage of the content item that was presented, such as 25% or 100%. As another example, the viewer feedback may identify a number of times that the recommended content item was presented in association with a content management account. As yet another example, the viewer feedback may identify a date or time of day that the recommended content item was presented in association with a content management account.

In particular embodiments, the type of viewer feedback identified for a content item may be strategically determined based on which types of feedback are most relevant. For example, content such as sports broadcasts may be time sensitive, so time-related information such as the date on which the content was viewed may be identified. As another example, a view count may particularly relevant for content such as a broadcast television channel. As yet another example, the percentage of a content item that was presented may help determine whether the recommendation was successful. For instance, a high percentage viewed, such as 85%, may be treated as a successful recommendation, while a low percentage viewed, such as 2%, may be treated as an unsuccessful recommendation.

At 608, a weighting value for each content item is determined based on the associated feedback. According to various embodiments, the weighting value may be implemented in terms of percentage weighting, integer weighting, real number weighting, weighting on a range of numbers, or any other weighting scale. For example, the initial weighting value may be a fixed multiplier such as 2 that is applied to every recommended content item of which at least a designated percentage was viewed. As another example, the initial weighting value may be related to information such as the percentage of the content item that was viewed or the number of times the content item was viewed. For instance, the initial weighting value may be set to a number such as two or three, multiplied by the percentage of the content item that was viewed. In particular embodiments, the techniques used to determine the weighting value may be strategically determined based on factors such as the type of numerical analysis performed in the recommendation system, the type of weighting values used in the numerical analysis, and the data set being analyzed.

In particular embodiments, a weighting value may map onto an express preference rating. For instance, if no express rating is provided for a media content item, a rating may be inferred based on viewer feedback. For example, when a designated percentage of a recommended content item is viewed, the content item may be assigned an associated preference rating, such as five out of five stars. The designated percentage may be 50%, 90%, or any other percentage.

At 610, one or more transformations to apply to the weighting values are identified. According to various embodiments, a transformation may adjust or emphasize the weighting values based on various considerations. For example, the initial weighting value may be a fixed multiplier for each content item for which over a designated percentage was presented. Then, the transformation may adjust the weighting values to reflect other information such as a number of times that the content item was viewed. For instance, the initial weighting value may be increased for content items that were viewed many times. As another example, the initial weighting value may be correlated with the percentage viewed of a content item. Then, a transformation may adjust the weighting values to apply a maximum or minimum value to the initial weighting values. For instance, an initial weighting value may be set to twice the percentage viewed. Then, a transformation may be applied to limit the maximum weighting value to 1.5.

At 612, the identified transformations are applied to the weighting value. According to various embodiments, the application of the transformations to the content items may be substantially similar to the operation 410 discussed with respect to FIG. 4.

At 614, one or more content recommendations are made based on the weighting values. According to various embodiments, various techniques may be used to make the content recommendations. For example, data from feedback-based weighting may be combined with data from other types of pre-processing, as discussed with respect to operation 416 in FIG. 4. For instance, data from feedback-based weighting may be combined with data from percent-viewed, view-count, or time-viewed weighting. Then, operations such as numerical modeling, post-processing, and content recommendation may be performed, as discussed with respect to operations 108, 112, and 116 in FIG. 1.

At 616, a determination is made as to whether to refine the feedback-based weighting analysis. According to various embodiments, the techniques employed in one or more operations discussed with respect to FIG. 6, such as operations 604, 608, 610, and 612 may be adjusted based on various types of information. For instance, successful recommendations may be used to reinforce or enhance the feedback-based weighting techniques used, while unsuccessful recommendations may be used to change or de-emphasize the feedback-based weighting techniques used. That is, techniques involved in operations such as selecting content items for weighting, applying weight based on feedback, and transforming the weighting values may be adjusted based on information such as whether evidence suggests that users agreed or disagreed with previous recommendations.

According to various embodiments, the determination as to whether to refine feedback-based weighting analysis may be made based on any of various factors. These factors may include, but are not limited to: the amount of new information available to the recommendation system, the number of recommendations that have been acted upon, and the amount of time that has passed since the recommendations were made.

At 618, the viewing history and preference data is updated. According to various embodiments, the updated viewing history and preference data may include various types of information not included in the original viewing history and preference data identified at operation 602. For example, the updated viewing history and preference data may include updated feedback or information regarding content newly watched by users. As another example, the updated data may indicate whether a user acted upon a recommendation made at operation 614 as well as any data regarding the user's reaction to the recommended content. The updated data may be used to adjust the techniques used to apply feedback-based weighting values to the content items and to transform the weighting values.

In particular embodiments, the viewing history and preference data may be updated based on user input. For instance, a user may review aggregated data regarding the success of various types of content recommendations and then dynamically alter or adjust techniques such as those used to weight content by feedback or to transform the weighting values.

At 620, the success of the content recommendations is evaluated. According to various embodiments, the updated data may include information indicative of content recommendation outcomes. For example, if a user ignored a recommendation made at operation 614, then the recommendation may be associated with a neutral or negative outcome. If a user selected a recommendation made at operation 614 but rated the recommended content item poorly or stopped viewing it after only a short period of time, the recommendation may be associated with a negative outcome. If a user selected a recommendation made at operation 614 and rated the recommended content item highly or viewed it nearly in its entirety, the recommendation may be associated with a positive outcome.

At 622, the weighting value determination and transformation identification procedures are adjusted. According to various embodiments, any or all of the techniques described with respect to operations 604, 608, 610, and 612 may be adjusted based on the success of the content recommendations. For example, depending on whether recommendations are more or less successful, initial weighting values for various types of content items and content feedback may be increased or decreased. As another example, the types of transformations or orders in which they are applied may be adjusted. For instance, a maximum weighting value may be increased or decreased. As yet another example, various types of content items may be selected or not selected for weighting by view count based on information such as the success of the recommendations produced from including or excluding them. Accordingly, the techniques for performing view-weighting in the recommendation system may be updated flexibly and dynamically.

Figure 7:
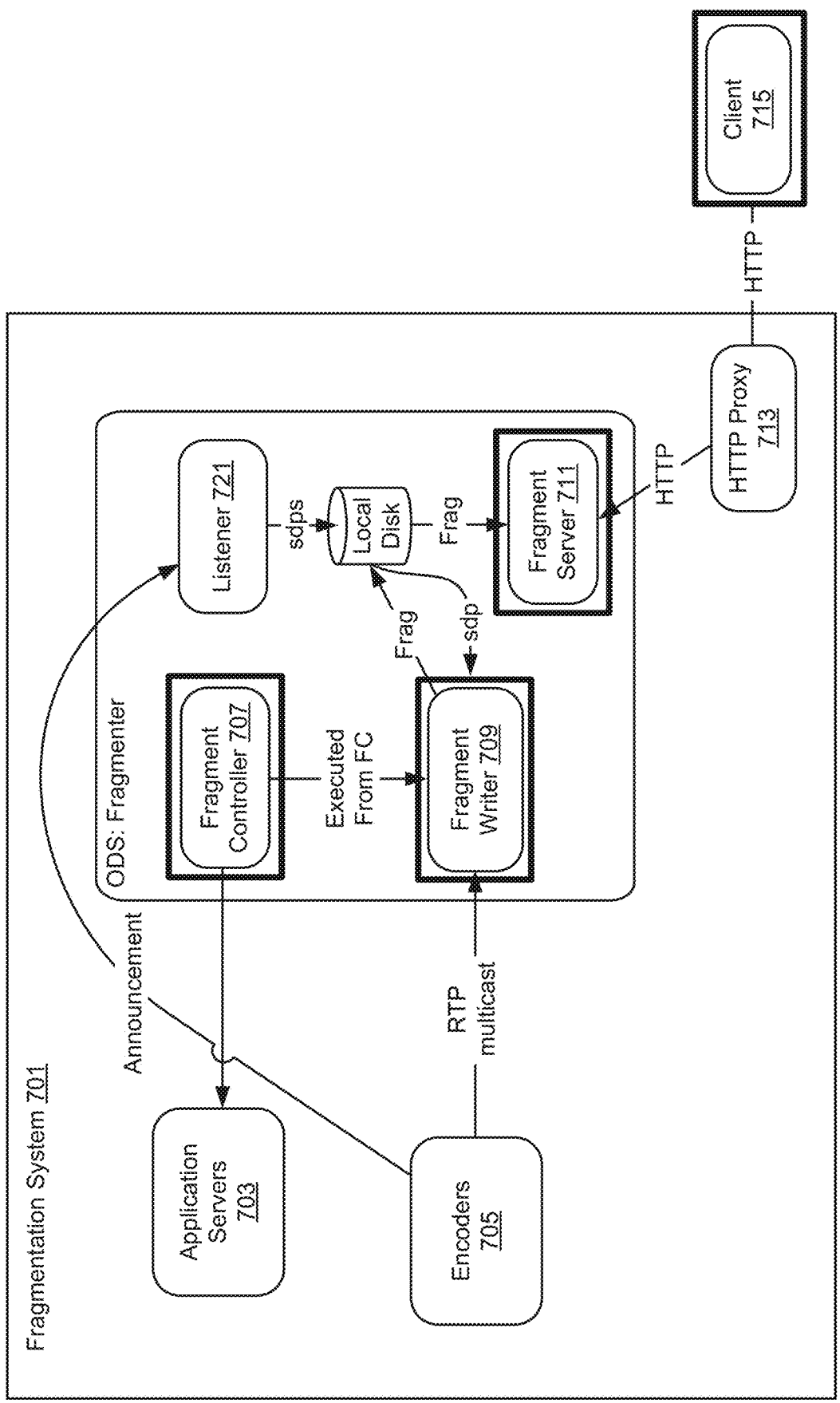
FIGS. 7-9 illustrate examples of systems.

FIG. 7 is a diagrammatic representation illustrating one example of a fragment or segment system 701 associated with a content server that may be used in a broadcast and unicast distribution network. Encoders 705 receive media data from satellite, content libraries, and other content sources and sends RTP multicast data to fragment writer 709. The encoders 705 also send session announcement protocol (SAP) announcements to SAP listener 721. According to various embodiments, the fragment writer 709 creates fragments for live streaming, and writes files to disk for recording. The fragment writer 709 receives RTP multicast streams from the encoders 705 and parses the streams to repackage the audio/video data as part of fragmented MPEG-4 files. When a new program starts, the fragment writer 709 creates a new MPEG-4 file on fragment storage and appends fragments. In particular embodiments, the fragment writer 709 supports live and/or DVR configurations.

The fragment server 711 provides the caching layer with fragments for clients. The design philosophy behind the client/server application programming interface (API) minimizes round trips and reduces complexity as much as possible when it comes to delivery of the media data to the client 715. The fragment server 711 provides live streams and/or DVR configurations.

The fragment controller 707 is connected to application servers 703 and controls the fragmentation of live channel streams. The fragmentation controller 707 optionally integrates guide data to drive the recordings for a global/network DVR. In particular embodiments, the fragment controller 707 embeds logic around the recording to simplify the fragment writer 709 component. According to various embodiments, the fragment controller 707 will run on the same host as the fragment writer 709. In particular embodiments, the fragment controller 707 instantiates instances of the fragment writer 709 and manages high availability.

According to various embodiments, the client 715 uses a media component that requests fragmented MPEG-4 files, allows trick-play, and manages bandwidth adaptation. The client communicates with the application services associated with HTTP proxy 713 to get guides and present the user with the recorded content available.

Figure 8:
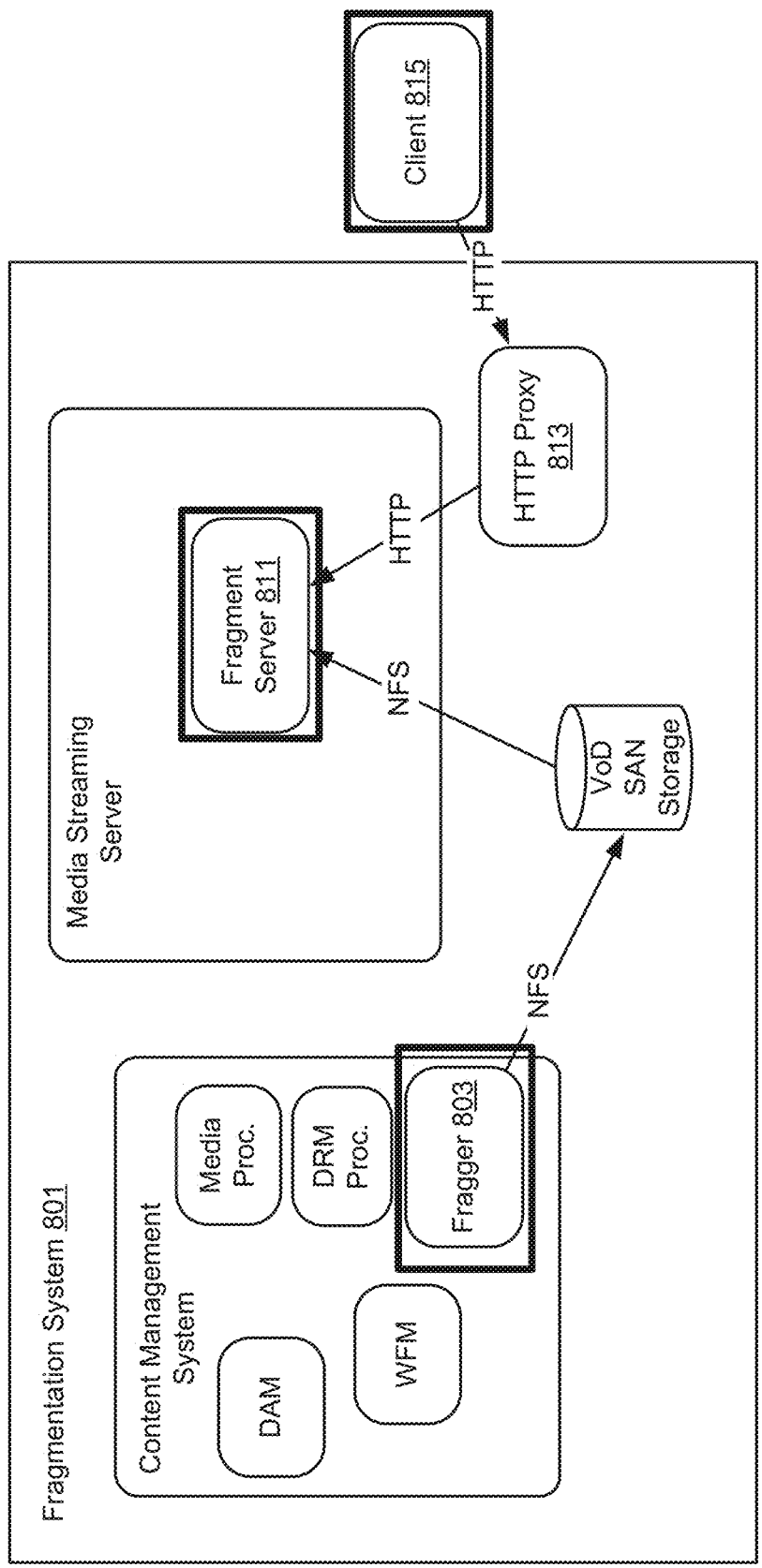

FIG. 8 illustrates one example of a fragmentation system 801 that can be used for video-on-demand (VoD) content. Fragger 803 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 811 provides the caching layer with fragments for clients. The design philosophy behind the client/server API minimizes round trips and reduces complexity as much as possible when it comes to delivery of the media data to the client 815. The fragment server 811 provides VoD content.

According to various embodiments, the client 815 uses a media component that requests fragmented MPEG-4 files, allows trick-play, and manages bandwidth adaptation. The client communicates with the application services associated with HTTP proxy 813 to get guides and present the user with the recorded content available.

Figure 9:
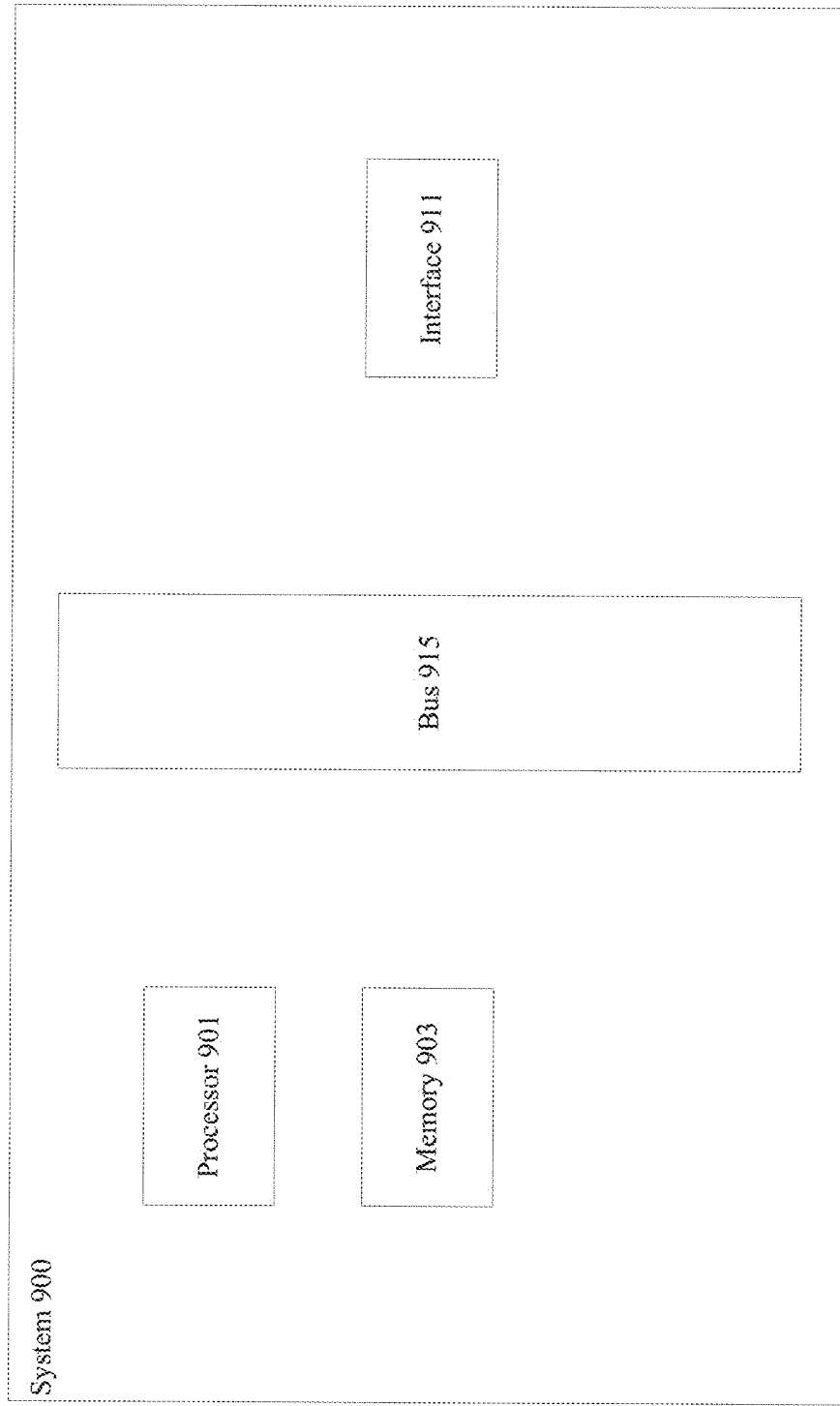

FIG. 9 illustrates one example of a server. According to particular embodiments, a system 900 suitable for implementing particular embodiments of the present invention includes a processor 901, a memory 903, an interface 911, and a bus 915 (e.g., a PCI bus or other interconnection fabric) and operates as a streaming server. When acting under the control of appropriate software or firmware, the processor 901 is responsible for modifying and transmitting live media data to a client. Various specially configured devices can also be used in place of a processor 901 or in addition to processor 901. The interface 911 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HS SI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 900 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
identifying input data for performing media content recommendation analysis, the input data describing presentations of a plurality of media content items in association with a plurality of content management accounts, wherein the input data comprises a plurality of data points, wherein each of the data points identifies a corresponding viewing attribute value for a respective one of the media content items presented in association with a respective one of the content management accounts;
weighting the input data by, for each or selected ones of the data points,
assigning an initial weighting factor to the data point in proportion to the corresponding viewing attribute value of the data point,
aggregating the data point according to one or more value ranges, such that the data point is assigned to a value range based on the corresponding viewing attribute value, wherein the value range is associated with a mathematical transformation, and
applying the mathematical transformation associated with the value range to the initial weighting factor of the data point;
storing on a storage system a plurality of media content recommendations produced by numerically modeling the weighted input data, each of the plurality of media content recommendations identifying a respective one of the media content items and a respective one of the content management accounts;

updating one or more of the plurality of media content recommendations based on outcomes corresponding to user activity corresponding to one or more designated media content items viewed in association with respective content management accounts; and adjusting the respective initial weighting factor or the respective mathematical transformation associated with a data point corresponding to the one or more designated media content items based on the outcomes.

2. The method recited in claim 1, wherein the corresponding viewing attribute value corresponds to a view count for the respective one of the media content items, wherein the view count identifies a number of times the respective one of the media content items has been presented in association with the respective one of the content management accounts.

3. The method recited in claim 1, wherein the corresponding viewing attribute value corresponds to a viewing percentage of the respective one of the media content items, wherein the viewing percentage identifies a percentage of a total length of the respective one of the media content items that has been presented in association with the respective one of the content management accounts.

4. The method recited in claim 1, wherein weighing the input data further comprises:
for each or selected ones of the data points,
aggregating the data point according one or more geo-locations, such that the data point is assigned to a grouping based on geo-location information associated with the data point, wherein the grouping is associated with a secondary weighting factor, and
assigning the secondary weighting factor to the data point.

5. The method recited in claim 1, wherein the mathematical transformation imposes a maximum or minimum value on the initial weighting factor.

6. The method recited in claim 1, wherein numerically modeling the weighted input data comprises assigning a respective numerical significance to the respective data point that correlates with the corresponding transformed initial weighting factor.

7. The method recited in claim 1, wherein each of the media content recommendations comprises an estimate of a preference for the respective media content item and the respective content management account.

8. The method recited in claim 1, wherein each media content item is an item selected from the group consisting of: a video object, a media content genre, a media content category, and a media content channel.

9. A system comprising:
a storage system operable to store input data for performing media content recommendation analysis, the input data describing presentations of a plurality of media content items in association with a plurality of content management accounts, wherein the input data comprises a plurality of data points, wherein each of the data points identifies a corresponding viewing attribute value for a respective one of the media content items presented in association with a respective one of the content management accounts; and
a processor operable to:
weight the input data by, for each or selected ones of the data points,
assign an initial weighting factor to the data point in proportion to the corresponding viewing attribute value of the data point,
aggregate the data point according to one or more value ranges, such that the data point is assigned to a value range based on the corresponding viewing attribute value, wherein the value range is associated with a mathematical transformation, and
apply the mathematical transformation associated with the value range to the initial weighting factor of the data point;
wherein the process is further operable to:
numerically model the weighted input data to produce a plurality of media content recommendations, each of the plurality of media content recommendations identifying a respective one of the media content items and a respective one of the content management accounts,
update one or more of the plurality of media content recommendations based on outcomes corresponding to user activity corresponding to one or more designated media content items viewed in association with respective content management accounts, and
adjust the respective initial weighting factor or the respective mathematical transformation associated with a data point corresponding to the one or more designated media content items based on the outcomes.

10. The system recited in claim 9, wherein the corresponding viewing attribute value corresponds to a view count for the respective one of the media content items, wherein the view count identifies a number of times the respective one of the media content items has been presented in association with the respective one of the content management accounts.

11. The system recited in claim 9, wherein the corresponding viewing attribute value corresponds to a viewing percentage of the respective one of the media content items, wherein the viewing percentage identifies a percentage of a total length of the respective one of the media content items that has been presented in association with the respective one of the content management accounts.

12. The system recited in claim 9, wherein the processor is further operable to weight the input data by:
for each or selected ones of the data points,
aggregating the data point according one or more geo-locations, such that the data point is assigned to a grouping based on geo-location information associated with the data point, wherein the grouping is associated with a secondary weighting factor, and
assigning the secondary weighting factor to the data point.

13. The system recited in claim 9, wherein the mathematical transformation imposes a maximum or minimum value on the initial weighting factor.

14. The system recited in claim 9, wherein numerically modeling the weighted input data comprises assigning a respective numerical significance to the respective data point that correlates with the corresponding transformed initial weighting factor.

15. The system recited in claim 9, wherein each of the media content recommendations comprises an estimate of a preference for the respective media content item and the respective content management account.

16. The system recited in claim 9, wherein each media content item is an item selected from the group consisting of:

a video object, a media content genre, a media content category, and a media content channel.

17. One or more computer readable media having instructions stored thereon for performing a method, the method comprising:
identifying input data for performing media content recommendation analysis, the input data describing presentations of a plurality of media content items in association with a plurality of content management accounts, wherein the input data comprises a plurality of data points, wherein each of the data points identifies a corresponding viewing attribute value for a respective one of the media content items presented in association with a respective one of the content management accounts;
weighting the input data by, for each or selected ones of the data points,
assigning an initial weighting factor to the data point in proportion to the corresponding viewing attribute value of the data point, aggregating the data point according to one or more value ranges, such that the data point is assigned to a value range based on the corresponding viewing attribute value, wherein the value range is associated with a mathematical transformation, and
applying the mathematical transformation associated with the value range to the initial weighting factor of the data point;
storing on a storage system a plurality of media content recommendations produced by numerically modeling the weighted input data, each of the plurality of media content recommendations identifying a respective one of the media content items and a respective one of the content management accounts;
updating one or more of the plurality of media content recommendations based on outcomes corresponding to user activity corresponding to one or more designated media content items viewed in association with respective content management accounts; and
adjusting the respective initial weighting factor or the respective mathematical transformation associated with a data point corresponding to the one or more designated media content items based on the outcomes.

18. The one or more computer readable media recited in claim 17, wherein the corresponding viewing attribute value corresponds to a view count for the respective one of the media content items, wherein the view count identifies a number of times the respective one of the media content items has been presented in association with the respective one of the content management accounts.

19. The one or more computer readable media recited in claim 17, wherein the corresponding viewing attribute value corresponds to a viewing percentage of the respective one of the media content items, wherein the viewing percentage identifies a percentage of a total length of the respective one of the media content items that has been presented in association with the respective one of the content management accounts.

20. The one or more computer readable media recited in claim 17, wherein the mathematical transformation imposes a maximum or minimum value on the initial weighting factor.

* * * * *